United States Patent Office 2,781,778
Patented Feb. 19, 1957

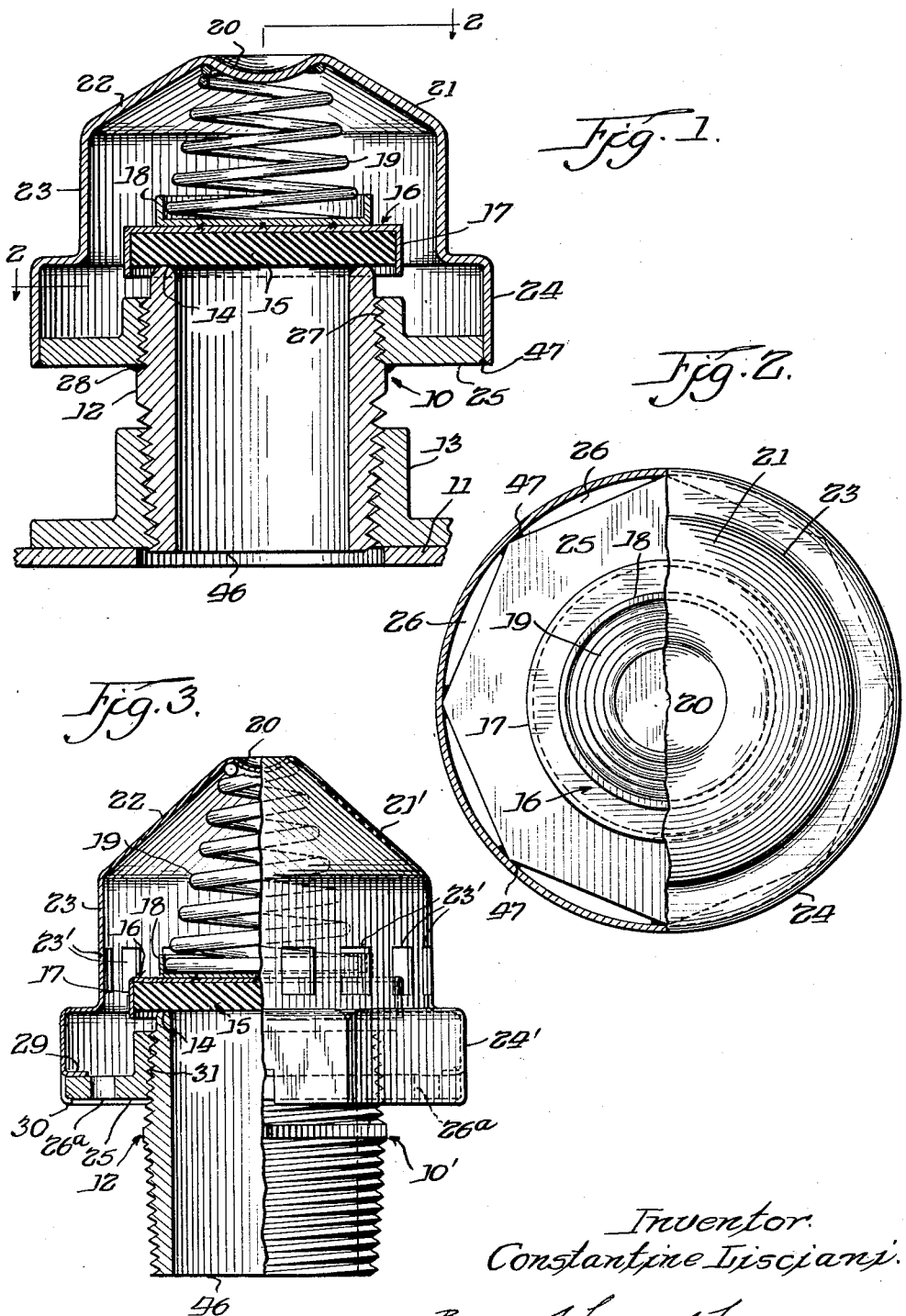

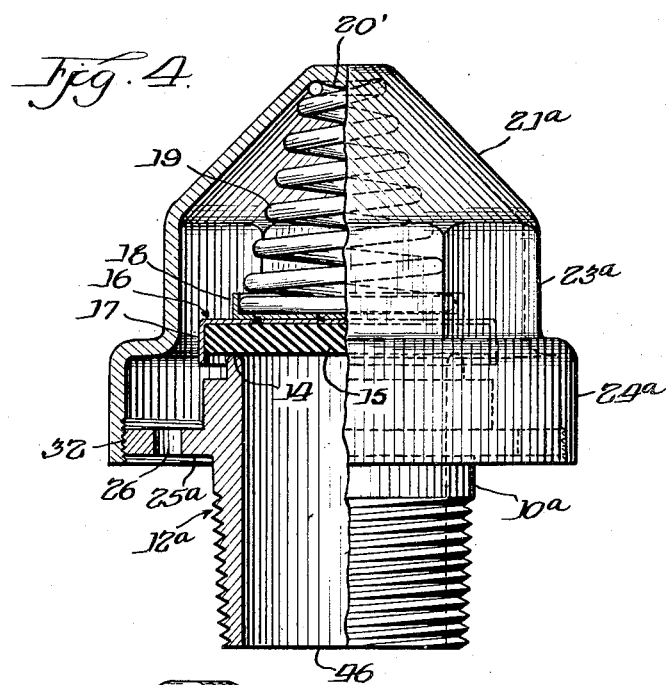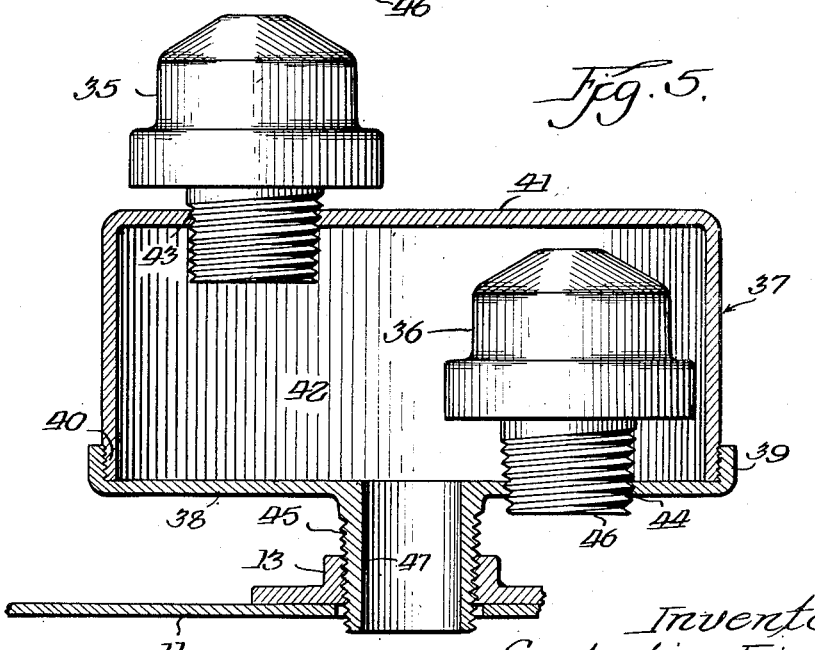

2,781,778

PRESSURE RELIEF VALVE STRUCTURE

Constantine Lisciani, Chicago, Ill., assignor to The Protectoseal Company, Chicago, Ill., a corporation of Illinois Application July 1, 1952, Serial No. 296,625

6 Claims. (Cl. 137—540)

This invention relates to a venting device, and more particularly it relates to pressure relief valve structures for storage drums, and similar containers.

The present invention is particularly adaptable for mounting on bung openings of storage tanks or drums containing oil, gas, or other volatile fluids, the devices being automatically operable to permit the escape of vapors when the interior pressure exceeds a selected amount, and to permit the flow of atmospheric air within the drum when the interior pressure falls below atmospheric pressure, the device otherwise remaining closed, thereby conserving vapor by minimizing the flow from the tank.

Under certain atmospheric conditions there is a tendency during certain periods when the excess heat causes the storage drums to burst or become distorted, since the vapor pressure of the liquid being stored may exceed the allowable working pressure of the drum. Under such conditions, the sun shining on the drums when stored out of doors may be the source of heat. The liquids usually are liquid fuels or solvents having high vapor pressure, and examples of these liquids are gasoline, naphtha, alcohol, etc.

It is therefore the principal object of the invention to provide a simple pressure relief valve structure which primarily is adapted to relieve excess pressure within the drum, and in certain embodiments, may be adapted as a vacuum relief valve to permit atmospheric air to enter the drum when the pressure within the drum is lower than that of the atmosphere caused by the cooling of the liquids within the drum during the evening after, for example, the vapor pressure exceeds atmospheric pressure during the day because of the sun shining on stored drums.

Another object of the invention is to provide an inexpensive and simple arrangement of parts adaptable for relieving excess pressure or the vacuum within a storage drum.

Still another object of the invention is to provide a pressure relief valve structure in which the pressure setting may be varied to accommodate any desired pressure.

A further object of the invention is to provide an improved vapor conservation venting device which is simple, easily assembled, inexpensive to manufacture, durable, and satisfactory for its intended purpose.

Another object of the invention is to provide a pressure relief valve structure in which the gasket which seals the valve floats within the housing of the valve structure, and in which the gasket retainer protrudes below the gasket edge to form a drip ring for the condensate.

Still another object of the invention is to provide a combined pressure and vacuum relief valve structure using the same valve relief structure mounted on a suitable housing, wherein one valve structure serves as a pressure relief valve, and the other valve structure serves as a vacuum relief valve.

In order to accomplish the above objects, simple fittings have been assembled so that the completed relief valve structure is adapted for detachably mounting upon the bung structure or other suitable opening of a storage drum, and the structure for mounting forms a part of the mechanism for adjusting the pressure within a predetermined valve setting at some ten to twelve pounds per square inch, which is satisfactory for a typical fifty-five gallon drum, which is usually factory-tested at fifteen pounds per square inch pressure. The valve is simply adjusted through the housing structure for the pressure relief valve and spring therefor, by rotating the housing structure with respect to the mounting for the valve structure.

Many other objects and advantages of the construction herein shown and described will be obvious to those skilled in the art from the disclosure herein given.

To this end, my invention consists in the novel construction, arrangement, and combination of parts herein shown and described, and more particularly pointed out in the claims.

In the drawings, wherein like reference characters indicate like or corresponding parts:

Fig. 1 is a view in elevation, partly in section, illustrating a pressure relief valve structure adapted for both pressure and vacuum relief;

Fig. 2 is a plan view, partly in section, taken approximately along line 2—2 illustrating the venting means for the relief valve structure of Fig. 1;

Fig. 3 is a modified form of pressure relief valve structure illustrating a modified form of housing structure and base providing the venting means;

Fig. 4 is an elevational view, partly in section, illustrating another form of pressure relief valve structure in which the hood structure and base therefor are modified to permit adjusting of the pressure relief spring; and, Fig. 5 illustrates the pressure relief valve structure assembled upon a housing structure permitting one of the valve structures to serve as a pressure relief, and the other valve structure to serve as a vacuum relief for the drum or storage container upon which it is mounted.

Referring to Figs. 1 and 2, a relief valve structure 10, which is adapted for either pressure or vacuum relief, is illustrated as assembled upon a storage drum 11, and comprises a conduit or nipple member 12 substantially in the form of a pipe coupling adapted to be coupled to the bung opening 13 complementally threaded to the threads on the conduit member. The upper end of the conduit member is provided with a valve seat 14 which is adapted to be sealed by a pressure relief gasket member 15 detachably mounted in a spring and gasket retainer assembly 16 formed by an inverted cup-shaped member 17 to mount the pressure relief gasket, and a smaller cup-shaped member 18 welded or affixed thereto in any suitable manner and complementally formed to the base of a conical pressure relief spring 19. The upper end of the conical spring 19 is retained in place by an indentation 20 or projection 20' (Fig. 4) on the hood structure 21 (Fig. 1) or 21a (Fig. 4). The hood structure 21 for enclosing the spring and the spring and gasket retainer assembly is shaped as illustrated in Figs. 1 and 2 having an upper and conical portion 22, an intermediate cylindrical portion 23, and a lower cylindrical portion 24 to which is affixed a hexagonal hood base 25. The hood base and lower cylindrical portion 24 are affixed by welding or soldering the intersections of the hexagonal sides of the hood base to the inner periphery of the cylindrical member 24 illustrated in Fig. 2, to provide vent openings 26 formed between the sides of the hood base and the inner periphery of the cylindrical portion of the hood structure to which it is adapted.

In order to adjust the valve within a predetermined pressure range determined by the strength of the drum, the hood base 25 is complementally threaded with respect to the upper end of the conduit member 12, as at 27.

The spring pressure setting may be varied by merely turning the threaded nipple or conduit 12 with respect to the hood base 25, or adjusting the hood base 25 with respect to the threaded nipple causing the seat 14 to spirally revolve up or down. The pressure setting of the spring 19 may vary between five and ten pounds per square inch for storage drums, the setting depending upon the type of drum and condition of the valve, whether new or reconditioned. When used as a pressure relief valve, the setting is normally higher than for use as a vacuum relief valve. It is to be understood that the pressure of the spring is dependent upon the conditions for which the relief valve structure is to be used. This manner of adjustment is somewhat different than the conventional design of pressure relief valves, wherein the spring is compressed without any movement of the seat or valve. It is preferred to factory preset the valve setting within predetermined limits, and lock the setting by soldering or welding, as at 28.

The inverted, cup-shaped member 17 is of such a length as to protrude below the edge of the gasket 15 to form a drip ring for the condensate, which is permitted to drain through the vents 26. In this construction, the gasket 15 floats within the housing 21, and its position is not fixed as in the conventional type of pressure relief valve, wherein the valve stem slides in a suitable guide.

In the embodiment illustrated in Fig. 3, the structure is similar to that of Figs. 1 and 2, but illustrates a modification thereof in the manner of assembling the hood base to the hood structure. Since certain of the members are similar, only those which have been modified will be described, and like reference characters will indicate same or similar parts. In this embodiment, the hood structure 21' is modified by having peripherally spaced lugs 29 struck from the lower hexagonally formed portion 24'. The hood base 25a of this embodiment is hexagonally formed complementally to the portion 24' and similar to the hexagonal hood base of Fig. 2, and is mounted upon the lugs 29, as shown, and the lower edge of the hexagonal portion 24' is spun over as at 30, securing the hood base to the hood structure after the conical spring 19 and spring and gasket retainer assembly 16 have been assembled in place. Instead of the vents 26 formed as in Fig. 2, drain holes 26a are spaced about the hood base by drilling or coring. Peripherally spaced vent holes 23' are provided in the hood structure 21' corresponding to vent holes 26 of Fig. 2.

The spring pressure is adjusted by rotating the valve housing, and in order to provide means for rotating the hood structure, the portion 24' is preferably hexagonally formed to receive a suitable wrench opening. As the hood structure 21' is axially adjusted up or down on the complementally threaded portions 31 of the hood base 25 and the conduit structure 12, the relief valve may be set within predetermined pressure limitations.

In the embodiment 10a of Fig. 4, a modified valve relief structure is illustrated in which the valve pressure is adjusted by threading the hood structure 21a on the hood base 25a through the complementally formed threads 32 formed on the cylindrical portion 24a and base 25a. In this modified form, the conduit member 12a is integrally formed with the hood base 25a, and the conduit member 12a is threaded upon the bung opening. Any adjustment necessary may be made by rotating the hood structure 21a with respect to the complementally threaded hood base 25a. If it is desired to factory preset the relief valve structure, the hood base 25a and hood structure 21a may be secured in its adjusted position by soldering, welding, or other suitable means.

Since the remaining portions of the pressure relief valve structure are similar to those of Figs. 1 and 3, like reference characters therefore indicate same and similar parts. In this embodiment of Fig. 4, the intermediate portion 23a may be formed hexagonally to receive a suitable wrench opening for adjusting the hood structure with respect to the hood base to provide the necessary adjustment of the spring 19.

In the assembly of each of these embodiments onto the bung structure of a storage drum, a suitable pipe wrench may be used for attaching the nipple structure 12, although it is within the scope of the invention that the intermediate portion of the conduit member 12 may be suitably modified, as with a hexagonal cross section, to receive a suitable thin wrench for mounting the preset relief structure onto the bung opening.

Referring to Fig. 5, there is illustrated a modification wherein there is formed a combined pressure and vacuum relief valve structure which may embody either of the embodiments of Figs. 1, 3, and 4, which may be preset so that one may serve as a pressure relief valve structure 35, and the other positioned, as shown, as a vacuum relief valve structure 36. In this embodiment, a housing structure 37 is provided with a base structure 38 having an upturned, threaded portion 39 to receive the complementally threaded end portion 40 of a cylindrical, inverted, cup-shaped member 41. The member 41 forms with the base 38, a hollow chamber 42 which is connected to the atmosphere through the pressure relief valve 35 and the vacuum relief valve 36, the pressure relief valve 35 being complementally threaded into the opening 43, and the vacuum relief valve 36 complementally threaded to the opening 44. It is preferred to assemble the pressure and vacuum relief valves 35 and 36 as illustrated in Fig. 5, although it is within the scope of the invention that the vacuum relief valve 36 may be threaded within a similarly formed opening in the cap 41, as the opening 43 for the pressure relief valve, but when attached in this manner, the vacuum relief valve 36 is inverted from the position illustrated. Likewise, if necessary, the vacuum relief valve 36 may be attached to the cylindrical periphery of the cap 41. Other arrangements for attaching the pressure relief and vacuum relief valves to provide a combined pressure and relief valve will suggest themselves to one skilled in the art without departing from the scope of the invention. The assembly, as shown, permits the ready inspection of the pressure relief valve 35, and by the removal of the cap 41, permits the inspection and setting of the vacuum relief valve 36. The assembled structure is assembled to a bung 13 of storage drum 11 by a threaded member 45 complementally threaded to the bung.

In each of the embodiments of Figs. 1, 2, and 4, excess pressure within the drum will cause the gasket assembly 16 to be biased upwardly against the pressure of the spring 19, permitting the volatile gases to escape through the opening between the gasket 15 and the seat 14 to be vented through the openings provided for venting. When each of these embodiments is arranged to function as a vacuum relief valve 36 in the embodiment of Fig. 5, and when the pressure within the tank is lower than that of the atmosphere, atmospheric air will enter through the opening 46 provided by the threaded nipple, biasing the gasket 15 away from its seat 14, permitting the atmospheric air to enter the chamber 42 through the vents 26 or 26a, depending upon the modification of the vacuum relief valve, and into the interior of the drum 11 through a passage 47 provided within the threaded nipple 45.

In each of the embodiments of Figs. 1, 2, 4, and 5, the gasket 15 or the pressure spring may be readily replaced when becoming worn or broken by detaching the hood structure 21 from its respective base 25, or modification thereof. When the pressure relief valve is factory set, this may be done either at the factory, or by local mechanics, by detaching base 25 by removing the seal 28 and breaking the welds between the hood structure and the base, as at 47. However, the factory preset embodiment of Fig. 1 is preferably thrown away when defective, and when it is desired to replace certain of the parts, the embodiments of Figs. 3 and 4 are preferable, since the hood structures may be more readily detached from their respective bases. In the embodiment of Fig. 3, this is accomplished by straightening the spun portion 30; and in the embodiment of Fig. 4, it is simply accomplished by detaching the hood structure 21a from the base 25a by unthreading these members.

It is thus evident that there has been provided a relief valve structure which is readily adapted either as a pressure relief valve, or as a vacuum relief valve, and which may be formed from simple fabricated, metal parts by pressing or drawing, and by casting or die casting certain of the other parts. Although the embodiment has been preferably shown using conical springs, it is to be understood that other suitable forms of compression springs may be used. It is also preferred to use a material for the gaskets 15, such as rubber or neoprene, which will withstand the highly volatile fluids which are stored within the container under the temperatures and pressures within which the relief valves are adapted to function. It is also to be understood that these relief valve structures are adaptable for extreme variations in temperature from that of the Tropics to that of the Arctic.

Having thus described my invention, it is obvious that various immaterial modifications may be made in the same without departing from the spirit of my invention; hence, I do not wish to be understood as limiting myself to the exact form, construction, arrangement, and combination of parts herein shown and described, or uses mentioned.

What I claim as new and desire to secure by Letters Patent is:

1. In a device of the class described, adapted for use as either a pressure relief valve means or a vacuum relief valve means, said relief valve means comprising a valve seat and a spring-biased pressure relief gasket adapted to seat on the valve seat, a conical pressure relief spring, concentric and oppositely positioned cup-shaped members, the lower of said cup-shaped members operatively receiving the pressure relief gasket and the upper coaxial cup-shaped member operatively receiving the conical pressure relief spring, and a rotatable hood means operatively connected to the conical pressure relief spring of the spring-biased pressure relief gasket for adjusting the setting of the relief valve means within predetermined limits of either pressure or vacuum relief, said hood means operatively enclosing the pressure relief spring, the cup-shaped members and the pressure relief gasket, said lower cup-shaped member extending below the pressure relief gasket, and providing a drip ring for condensate formed within the hood means, whereby the relief valve means, depending upon the manner in which it is mounted upon the tank, is adapted for use either as a pressure relief valve means or a vacuum relief valve means.

2. In a device of the class described, a relief valve means adapted to relieve excess pressure, said relief valve means comprising a valve seat and a spring-biased pressure relief gasket adapted to seat upon the valve seat, a conical pressure relief spring, concentric and oppositely positioned cup-shaped members, the lower of said cup-shaped members operatively receiving the pressure relief gasket and the upper coaxial cup-shaped member operatively receiving the conical pressure relief spring, adjusting means including a rotatable hood structure operatively connected to the conical pressure relief spring of the spring-biased pressure relief gasket for setting of the relief valve means within predetermined limits of pressure relief, said rotatable hood structure operatively enclosing the pressure relief spring, the cup-shaped members and the pressure relief gasket, said lower and upper cup-shaped members integrally affixed together, and said lower cup-shaped member extending below the pressure relief gasket and providing a drip ring for condensate formed within the rotatable hood structure.

3. As an article of manufacture, a relief valve means for a fluid storage container comprising a hood base, a conduit means operatively connected to the hood base, a valve seat formed on the conduit means, an apertured hood structure operatively connected to the hood base, and pressure responsive means comprising a spring-biased pressure relief gasket adapted to seat upon the valve, a conical pressure relief spring, concentric and oppositely positioned cup-shaped members, the lower of said cup-shaped members operatively receiving the pressure relief gasket and the upper coaxial cup-shaped member operatively receiving the conical pressure relief spring, said pressure relief gasket operatively connected by the conical pressure relief spring to said apertured hood structure for setting of the relief valve within predetermined limits of pressure relief, said apertured hood structure operatively enclosing the pressure relief spring, the cup-shaped members and the pressure relief gasket, said lower and upper cup-shaped members integrally affixed together, and said lower cup-shaped member extending below the pressure relief gasket and providing a drip ring for condensate formed within said hood structure.

4. A relief valve means comprising, in combination, a conduit means adapted for operatively connecting the relief valve means to the exterior of a storage container, a valve seat carried by said conduit means, and spring-biased pressure relief gasket means including a conical pressure relief spring for setting the relief valve means within predetermined limits of pressure relief, a hood structure for the spring-biased pressure relief gasket means including a hood base, venting means formed on the hood structure operatively connecting the conduit means to the atmosphere, a chamber formed by the hood structure and hood base for receiving the spring biased pressure relief means, and drain holes formed in said hood base, and said spring-biased pressure relief gasket means comprising upper and lower cup-shaped members and a gasket, said lower cup-shaped member operatively mounting the gasket and providing drip means adapted for draining condensate toward the drain holes.

5. A relief valve means comprising, in combination, a conduit means adapted for operatively connecting the relief valve means to the exterior of a storage container, an annular valve seat carried by said conduit means, a gasket for the valve seat, a spring for biasing the gasket in position upon the valve seat, an apertured hood structure for the relief valve means, a spring and gasket retainer, said spring and gasket retainer comprising concentric and oppositely positioned cup-shaped members, the lower of said cup-shaped members operatively receiving the pressure relief gasket and the upper coaxial cup-shaped member operatively receiving the pressure relief spring, said spring and spring and gasket retainer operatively mounted with respect to said apertured hood structure allowing the gasket to floatingly seat on the annular valve seat, said lower cup-shaped member also providing a drip ring for condensate formed within the hood structure.

6. A relief valve structure comprising, in combination, a conduit means, valve means including a valve seat carried by said conduit means and spring-biased gasket means including a conical shaped spring for setting the valve means within a predetermined pressure range, a hood structure including a hood base forming a chamber within which the valve means and spring-biased gasket means is positioned, concentric and oppositely positioned cup-shaped members, the lower of said cup-shaped members operatively receiving the gasket means and the coaxial cup-shaped member operatively receiving the conical shaped spring, said lower cup-shaped member also providing a dripping for condensate formed within the hood structure, and said hood structure deformed to complementally receive a wrench opening at the periphery of the hood structure, and said deformation of the hood structure being geometrical in shape and varying in the size of opening between a maximum opening being complemental to the juncture of the hood structure to the hood base, and a smaller wrench opening intermediate in size between the juncture of the hood base with the conduit means.

References Cited in the file of this patent

UNITED STATES PATENTS

| | | | |
|---|---|---|---|
| 507,636 | Schneider | Oct. 31, | 1893 |
| 1,156,469 | Dodge | Oct. 12, | 1915 |
| 1,480,155 | Darling | Jan. 8, | 1924 |
| 1,492,579 | Ray | May 6, | 1924 |
| 1,644,265 | Noble | Oct. 4, | 1927 |
| 1,673,470 | Puffer | June 12, | 1928 |
| 1,694,492 | Tabler | Dec. 11, | 1928 |
| 1,800,185 | Thrush | Apr. 7, | 1931 |
| 1,918,807 | Glab | July 18, | 1933 |
| 1,934,314 | Lawler | Nov. 7, | 1933 |
| 2,005,931 | Buttner | June 25, | 1935 |
| 2,086,942 | Mandeville | July 13, | 1937 |
| 2,086,969 | Strelow | July 13, | 1937 |
| 2,110,481 | Crocker | Mar. 8, | 1938 |
| 2,254,209 | Buttner | Sept. 2, | 1941 |
| 2,273,737 | Snyder | Feb. 17, | 1942 |
| 2,290,177 | Grant | July 21, | 1942 |
| 2,452,612 | Swenberg | Nov. 2, | 1948 |
| 2,505,949 | De Vilbiss | May 2, | 1950 |

FOREIGN PATENTS

| | | | |
|---|---|---|---|
| 706,517 | France | Mar. 30, | 1931 |
| 424,102 | Great Britain | Feb. 14, | 1935 |
| 806,127 | France | Sept. 14, | 1936 |